US010095232B1

United States Patent
Arbuckle et al.

(10) Patent No.: US 10,095,232 B1
(45) Date of Patent: Oct. 9, 2018

(54) STATION KEEPING METHODS

(71) Applicant: Brunswick Corporation, Lake Forest, IL (US)

(72) Inventors: Jason S. Arbuckle, Horicon, WI (US); Thomas S. Kirchhoff, Fond Du Lac, WI (US); Steven J. Andrasko, Oshkosh, WI (US); Michael M. Blackwood, Oshkosh, WI (US); Kenneth G. Gable, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 56 days.

(21) Appl. No.: 15/445,031

(22) Filed: Feb. 28, 2017

Related U.S. Application Data

(60) Provisional application No. 62/301,887, filed on Mar. 1, 2016.

(51) Int. Cl.
*G05D 1/00* (2006.01)
*G05D 1/02* (2006.01)
(Continued)

(52) U.S. Cl.
CPC .......... *G05D 1/0208* (2013.01); *B63B 49/00* (2013.01); *B63H 20/00* (2013.01); *B63H 21/21* (2013.01);
(Continued)

(58) Field of Classification Search
CPC ... B63B 2035/738; B63B 21/00; B63B 21/50; B63B 2213/00; B63B 2727/02;
(Continued)

(56) References Cited

U.S. PATENT DOCUMENTS 3,187,704 A  6/1965  Shatto, Jr. et al.
3,688,252 A  8/1972  Thompson
(Continued)

FOREIGN PATENT DOCUMENTS

EP     816962 A1   7/1998
EP     2161542 A1  3/2010
(Continued)

OTHER PUBLICATIONS

Ward et al., "Method and System for Close Proximity Collision Detection", U.S. Appl. No. 14/807,217, filed Jul. 23, 2015.
(Continued)

*Primary Examiner* — Redhwan K Mawari
(74) *Attorney, Agent, or Firm* — Andrus Intellectual Property Law, LLP

(57) ABSTRACT

A method for maintaining position and/or heading of a marine vessel in a body of water includes accepting a command to maintain the vessel at an initial selected position and/or heading, and utilizing position/heading feedback control to determine initial steering angles, gear positions, and engine speeds for the vessel's propulsion devices that cause the propulsion devices to produce thrust that counteracts a net external force and moment on the vessel and maintains the vessel at the initial selected position/heading. The method also includes propelling the vessel to a new selected position/heading, and accepting a command to maintain the vessel at the new selected position/heading. The method next includes utilizing information related to one of the position/heading feedback control and the propulsion devices' thrust to predict control parameters required to maintain the vessel at the new selected position/heading, and controlling the propulsion device according to the predicted control parameters.

20 Claims, 7 Drawing Sheets

(51) Int. Cl.
*B63B 49/00* (2006.01)
*B63H 25/04* (2006.01)
*B63H 25/42* (2006.01)
*B63H 20/00* (2006.01)
*B63H 21/21* (2006.01)

(52) U.S. Cl.
CPC ............. *B63H 25/04* (2013.01); *B63H 25/42* (2013.01); *B63B 2213/02* (2013.01); *B63B 2758/00* (2013.01); *B63H 2020/003* (2013.01); *B63H 2021/216* (2013.01)

(58) Field of Classification Search
CPC ... B63B 2751/00; B63B 35/00; B63B 39/005; B63B 39/061
See application file for complete search history.

(56) References Cited

U.S. PATENT DOCUMENTS

| | | |
|---|---|---|
| 3,715,571 A | 2/1973 | Braddon |
| 3,771,483 A | 11/1973 | Spencer |
| 4,253,149 A | 2/1981 | Cunningham et al. |
| 4,428,052 A | 1/1984 | Robinson et al. |
| 4,513,378 A | 4/1985 | Antkowiak |
| 4,769,773 A | 9/1988 | Shatto, Jr. |
| 4,939,661 A | 7/1990 | Barker et al. |
| 4,975,709 A | 12/1990 | Koike |
| 5,172,324 A | 12/1992 | Knight |
| 5,202,835 A | 4/1993 | Knight |
| 5,331,558 A | 7/1994 | Hossfield et al. |
| 5,362,263 A | 11/1994 | Petty |
| 5,386,368 A | 1/1995 | Knight |
| 5,390,125 A | 2/1995 | Sennott et al. |
| 5,491,636 A | 2/1996 | Robertson et al. |
| 5,736,962 A | 4/1998 | Tendler |
| 5,884,213 A | 3/1999 | Carlson |
| 6,059,226 A | 5/2000 | Cotton et al. |
| 6,092,007 A | 7/2000 | Cotton et al. |
| 6,230,642 B1 | 5/2001 | McKenney et al. |
| 6,234,853 B1 | 5/2001 | Lanyi et al. |
| 6,273,771 B1 | 8/2001 | Buckley et al. |
| 6,308,651 B2 | 10/2001 | McKenney et al. |
| 6,377,889 B1 | 4/2002 | Soest |
| 6,446,003 B1 | 9/2002 | Green et al. |
| 6,485,341 B1 | 11/2002 | Lanyi et al. |
| 6,604,479 B2 | 8/2003 | McKenney et al. |
| 6,678,589 B2 | 1/2004 | Robertson et al. |
| 6,848,382 B1 | 2/2005 | Bekker |
| 6,995,527 B2 | 2/2006 | DePasqua et al. |
| 7,140,315 B2 | 11/2006 | Okuyama |
| 7,267,068 B2 | 9/2007 | Bradley et al. |
| 7,268,703 B1 | 9/2007 | Kabel et al. |
| 7,305,928 B2 | 12/2007 | Bradley et al. |
| 7,366,593 B2 | 4/2008 | Fujimoto et al. |
| 7,398,742 B1 | 7/2008 | Gonring |
| 7,416,458 B2 | 8/2008 | Suemori et al. |
| 7,467,595 B1 | 12/2008 | Lanyi et al. |
| 7,476,134 B1 | 1/2009 | Fell et al. |
| 7,538,511 B2 | 5/2009 | Samek |
| 7,561,886 B1 | 7/2009 | Gonring et al. |
| 7,577,526 B2 | 8/2009 | Kim et al. |
| 7,630,798 B2 | 12/2009 | Mossman et al. |
| 7,727,036 B1 | 6/2010 | Poorman et al. |
| 8,050,630 B1 | 11/2011 | Arbuckle |
| 8,082,100 B2 | 12/2011 | Grace et al. |
| 8,145,370 B2 | 3/2012 | Borrett |
| 8,145,371 B2 | 3/2012 | Rae et al. |
| 8,150,621 B1 | 4/2012 | Phillips et al. |
| 8,155,811 B2 | 4/2012 | Noffsinger et al. |
| 8,215,252 B1 | 7/2012 | Chun |
| 8,265,812 B2 | 9/2012 | Pease |
| 8,326,472 B2 | 12/2012 | Igarashi et al. |
| 8,417,399 B2 | 4/2013 | Arbuckle et al. |
| 8,478,464 B2 | 7/2013 | Arbuckle et al. |
| 8,480,445 B2 | 7/2013 | Morvillo |
| 8,510,028 B2 | 8/2013 | Grace et al. |
| 8,515,660 B2 | 8/2013 | Grace et al. |
| 8,515,661 B2 | 8/2013 | Grace et al. |
| 8,527,192 B2 | 9/2013 | Grace et al. |
| 8,543,324 B2 | 9/2013 | Grace et al. |
| 8,645,012 B2 | 2/2014 | Salmon et al. |
| 8,694,248 B1 | 4/2014 | Arbuckle et al. |
| 8,761,976 B2 | 6/2014 | Salmon et al. |
| 8,777,681 B1 | 7/2014 | McNalley et al. |
| 8,807,059 B1 | 8/2014 | Samples et al. |
| 8,831,868 B2 | 9/2014 | Grace et al. |
| 8,924,054 B1 | 12/2014 | Arbuckle et al. |
| 9,039,468 B1 | 5/2015 | Arbuckle et al. |
| 9,110,467 B2 | 8/2015 | Yuet et al. |
| 9,132,900 B2 | 9/2015 | Salmon et al. |
| 9,132,903 B1 | 9/2015 | Gable et al. |
| 9,162,743 B2 | 10/2015 | Grace et al. |
| 9,248,898 B1 | 2/2016 | Kirchhoff et al. |
| 9,359,057 B1 | 6/2016 | Andrasko et al. |
| 9,377,780 B1 | 6/2016 | Arbuckle et al. |
| 9,676,464 B2 | 6/2017 | Johnson et al. |
| 2003/0191562 A1 | 10/2003 | Robertson et al. |
| 2004/0221787 A1 | 11/2004 | McKenney et al. |
| 2005/0164569 A1* | 7/2005 | Kaji ...................... B63H 21/21 440/1 |
| 2005/0170713 A1 | 8/2005 | Okuyama |
| 2006/0089794 A1 | 4/2006 | DePasqua |
| 2006/0116796 A1 | 6/2006 | Fossen et al. |
| 2007/0017426 A1 | 1/2007 | Kaji et al. |
| 2007/0089660 A1 | 4/2007 | Bradley et al. |
| 2007/0162207 A1 | 7/2007 | Shimo et al. |
| 2007/0178779 A1 | 8/2007 | Takada et al. |
| 2007/0203623 A1 | 8/2007 | Saunders et al. |
| 2007/0233389 A1 | 10/2007 | Stephens |
| 2009/0037040 A1 | 2/2009 | Salmon et al. |
| 2009/0171520 A1 | 7/2009 | Kaji |
| 2009/0276148 A1 | 11/2009 | Ardvisson |
| 2010/0023192 A1 | 1/2010 | Rae et al. |
| 2010/0109944 A1 | 5/2010 | Whitehead et al. |
| 2010/0145558 A1* | 6/2010 | Kaji ...................... B63H 25/02 701/21 |
| 2011/0153126 A1 | 6/2011 | Arbuckle et al. |
| 2012/0129410 A1 | 5/2012 | Tyers |
| 2012/0130570 A1 | 5/2012 | Pease |
| 2012/0248259 A1 | 10/2012 | Page et al. |
| 2013/0080044 A1 | 3/2013 | Tyers et al. |
| 2013/0297104 A1 | 11/2013 | Tyers et al. |
| 2014/0114509 A1 | 4/2014 | Venables et al. |
| 2015/0089427 A1 | 3/2015 | Akuzawa |
| 2015/0277442 A1 | 10/2015 | Ballou |
| 2015/0346730 A1 | 12/2015 | Stephens et al. |
| 2016/0016651 A1 | 1/2016 | Anderson et al. |
| 2016/0101838 A1 | 4/2016 | Kojima |
| 2016/0125739 A1 | 5/2016 | Stewart et al. |
| 2016/0246300 A1 | 8/2016 | Langford-Wood |
| 2016/0252907 A1 | 9/2016 | Parkinson |
| 2016/0334792 A1* | 11/2016 | Jopling ................ G05D 1/0206 |
| 2017/0205828 A1* | 7/2017 | Estabrook ............ G05D 1/0206 |
| 2017/0205829 A1* | 7/2017 | Tyers .................. G05D 1/0206 |
| 2017/0210449 A1* | 7/2017 | Frisbie .................... B63B 49/00 |
| 2017/0255200 A1* | 9/2017 | Arbuckle ............... B63H 21/21 |
| 2017/0277189 A1* | 9/2017 | Johnson ............... G05D 1/0206 |
| 2017/0349257 A1* | 12/2017 | Hara ...................... B63H 25/02 |
| 2017/0365175 A1* | 12/2017 | Harnett .................... G08G 3/02 |
| 2018/0015994 A1* | 1/2018 | Kishimoto ............. B63H 25/04 |

FOREIGN PATENT DOCUMENTS

| | | |
|---|---|---|
| GB | 1173442 | 12/1969 |
| JP | 58061097 | 4/1983 |
| JP | 05-203638 A | 8/1993 |
| JP | 7223591 | 8/1995 |
| JP | 2926533 B2 | 7/1997 |
| JP | 11-129978 A | 5/1999 |
| JP | 2002173091 A | 6/2002 |
| JP | 2003276677 A | 10/2003 |
| JP | 200442884 A | 2/2004 |
| JP | 2004355105 A | 12/2004 |

(56) References Cited

FOREIGN PATENT DOCUMENTS

| | | |
|---|---|---|
| JP | 2006137309 A | 6/2006 |
| JP | 2009-227035 | 10/2009 |
| JP | 2009-241738 | 10/2009 |
| JP | 2009-538782 A | 11/2009 |
| JP | 2011128943 | 6/2011 |
| JP | 5042906 B2 | 7/2012 |
| JP | 2012528417 A | 11/2012 |
| JP | 5226355 B2 | 7/2013 |
| JP | 2014065495 | 4/2014 |
| JP | 200546034 A | 2/2015 |
| WO | 9205505 A1 | 4/1992 |
| WO | WO 2006058400 | 6/2006 |
| WO | WO 2016104031 | 6/2016 |

OTHER PUBLICATIONS

Poorman et al., "Multilayer Control System and Method for Controlling Movement of a Marine Vessel", U.S. Appl. No. 11/965,583, filed Dec. 27, 2007.
Andrasko et al., "System and Method for Controlling Handling of a Marine Vessel", U.S. Appl. No. 14/484,702, filed Sep. 12, 2014.
Man Diesel and Turbo, Basic Principles of Ship Propulsion, paper, Dec. 2011, Denmark.
Beauregard, Brett, "Improving the Beginner's PID: Initialization," web article, posted Apr. 15, 2011, available at http://brettbeauregard.com/blog/2011/04/improvingthebeginner%e2%80%99spidinitialization/.

* cited by examiner

STATION KEEPING METHODS

CROSS-REFERENCE TO RELATED APPLICATION

The present application claims the benefit of U.S. Provisional Application Ser. No. 62/301,887, filed on Mar. 1, 2016, which is hereby incorporated by reference.

FIELD

The present disclosure relates to automatic positioning systems and methods for marine vessels.

BACKGROUND

U.S. Pat. No. 6,273,771, which is hereby incorporated by reference herein, discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,305,928, which is hereby incorporated by reference herein, discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Pat. No. 8,478,464, which is hereby incorporated by reference herein, discloses systems and methods for orienting a marine vessel to enhance available thrust in a station keeping mode. A control device having a memory and a programmable circuit is programmed to control operation of a plurality of marine propulsion devices to maintain orientation of a marine vessel in a selected global position. The control device is programmed to calculate a direction of a resultant thrust vector associated with the plurality of marine propulsion devices that is necessary to maintain the vessel in the selected global position. The control device is programmed to control operation of the plurality of marine propulsion devices to change the actual heading of the marine vessel to align the actual heading with the thrust vector.

Other patents describing various station keeping features and related system and method improvements include: U.S. Pat. Nos. 7,267,068; 8,050,630; 8,417,399; 8,694,248; 8,807,059; 8,924,054; 9,132,903; 9,377,780; and unpublished U.S. patent application Ser. No. 14/484,702, filed Sep. 12, 2014; and Ser. No. 14/807,217, filed Jul. 23, 2015. Each of these patents and applications is hereby incorporated by reference herein.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One example of the present disclosure is of a method for maintaining position of a marine vessel in a body of water, the vessel being propelled by a marine propulsion device powered by an engine. The method includes accepting a command to maintain the vessel at an initial selected position, and utilizing position feedback control to determine an initial steering angle, an initial gear position, and an initial engine speed for the propulsion device that cause the propulsion device to produce a linear thrust vector that counteracts a net external force on the vessel and maintains the vessel in the initial selected position. The method also includes propelling the vessel to a new selected position, and accepting a command to maintain the vessel at the new selected position. The method next includes utilizing information related to one of the position feedback control and the linear thrust vector to predict control parameters required to maintain the vessel at the new selected position, and controlling the propulsion device according to the predicted control parameters to maintain the vessel at the new selected position.

Another example is of a method for maintaining orientation of a marine vessel in a body of water, the vessel being propelled by first and second marine propulsion devices powered by first and second engines, respectively. The method includes accepting a command to maintain the vessel at an initial selected heading, and utilizing heading feedback control to determine initial steering angles, initial gear positions, and initial engine speeds for the first and second propulsion devices, respectively, which result in the first and second propulsion devices together producing a resultant moment about a preselected point on the vessel that counteracts a net external moment on the vessel and maintains the vessel at an initial selected heading. The method also includes rotating the vessel to a new selected heading, and accepting a command to maintain the vessel at the new selected heading. The method next includes utilizing information related to one of the heading feedback control and the resultant moment to predict control parameters required to maintain the vessel at the new selected heading, and controlling the first and second propulsion devices according to the predicted control parameters to maintain the vessel at the new selected heading.

Another method according to the present disclosure is for maintaining position and orientation of a marine vessel in a body of water, the marine vessel being propelled by first and second marine propulsion devices powered by first and second engines, respectively. The method comprises determining initial steering angles, initial gear positions, and initial engine speeds for the first and second propulsion devices, respectively, which result in the first and second propulsion devices together producing a resultant linear thrust vector that counteracts a net external force on the vessel and maintains the vessel in an initial selected position, and which result in the first and second propulsion devices together producing a resultant moment about a preselected point on the vessel that counteracts a net external moment on the vessel and maintains the vessel at an initial selected heading. The method also includes propelling the vessel to a new selected position, rotating the vessel to a new selected heading, and accepting a command to maintain the vessel at the new selected position and at the new selected heading. Next, the method includes calculating new steering angles, new gear positions, and new engine speeds for the first and second propulsion devices, respectively, that will result in the first and second propulsion devices together creating the same resultant linear thrust vector that was required to counteract the net external force on the vessel at the initial position and the same resultant moment that was required to counteract the net external moment on the vessel at the initial heading. The method also includes rotating the first and second propulsion devices to the new steering angles, respectively, placing the first and second propulsion devices in the new gear positions, respectively, and causing the first and second engines to rotate at the new engine speeds, respectively, to produce the same resultant linear thrust vector and the same resultant moment and maintain the vessel at the new selected position and the new selected heading.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
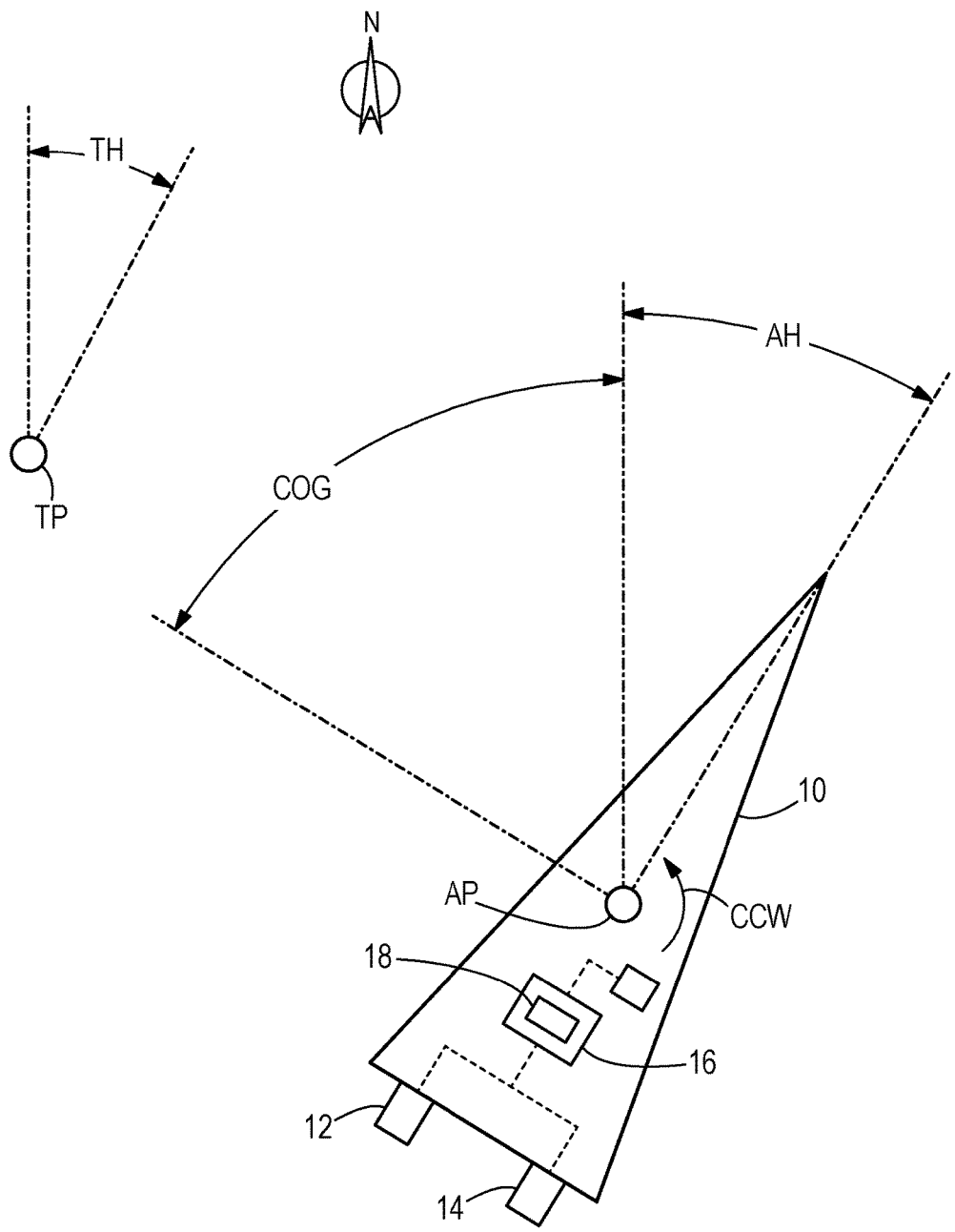
FIG. 1 is a schematic for purposes of illustrating a method for maintaining a marine vessel at a target global position and a target heading.

Referring to FIG. 1, in a station keeping mode, a marine vessel 10 can be maintained in a single global position (defined by latitude and longitude) and at a predetermined heading by way of an algorithm that controls the vessel's propulsion devices 12, 14 to counteract the effects of wind, waves, current, etc. that would tend to move the vessel 10 off this location and/or to a new heading. In essence, the propulsion devices 12, 14 are controlled to maintain the vessel 10 at a virtual anchor point. A control module 16 that controls thrust and angular orientation of the propulsion devices 12, 14 acts as a joystick and calculates left/right, fore/aft, and yaw commands required to drive the vessel's position error and heading error to zero. The control module 16 can control one or more propulsion devices 12, 14 to do so, which may be located at the rear of the vessel 10 such as with outboards or stern drives, under the vessel 10 such as with pod drives, or at the front, back, or sides of the vessel 10 such as with thrusters.

An example of the inputs to the control module's calculations is shown in FIG. 1. In this example, the actual global position (AP) of a preselected point on the vessel 10, as determined by a GPS receiver, is not equal to a setpoint target global position (TP), and thus the control module 16 will calculate a course over ground (COG) that the vessel 10 must travel to reach the target global position TP. Additionally, a setpoint target heading (TH) is 27 degrees from north, while the actual heading (AH) read from a compass or an inertial measurement unit (IMU) is 35.8 degrees. The control module 16 will therefore determine that a counterclockwise yaw movement (arrow CCW) of 8.8 degrees is required to return the vessel 10 to the target heading TH.

The control module 16 determines when and how much corrective action to take according to a three-dimensional (left/right, fore/aft, and yaw) proportional, integral, and derivative (PID) control algorithm performed by a feedback controller 18 of the control module 16. The integral term allows the control system to reject constant and slowly varying disturbances (e.g., current) while maintaining near zero position error. The proportional and derivative terms handle the quickly varying disturbances. The integral term is also considered to have memory and can take time to increase or decrease, especially if the disturbance forces grow. The PID feedback controller 18 computes a desired force in the forward/back and left/right directions with reference to the marine vessel 10, along with a desired yaw moment relative to the marine vessel 10, in order to null the error elements. The computed force and moment elements are then transmitted to the vessel propulsion system, which delivers the requested forces and moments by positioning the independently steerable propulsion devices 12, 14, controlling the power provided to the propellers of each device, and controlling the thrust vector directions of both devices. Such automatic correction of the position and heading of the marine vessel 10 can be achieved according to the principles described in U.S. Pat. No. 7,305,928, which was incorporated by reference herein above.

Figure 2:
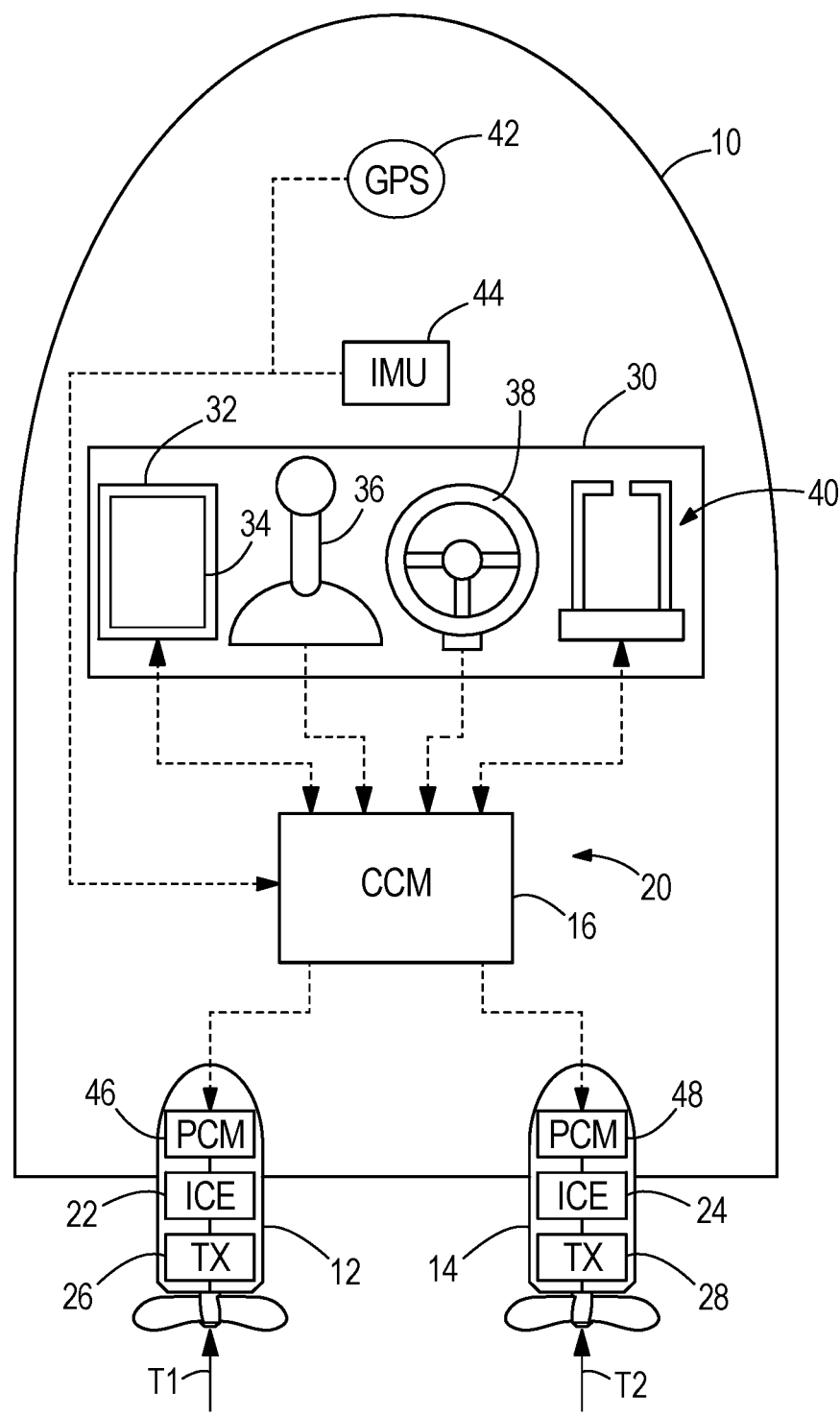
FIG. 2 is a schematic illustration of a marine vessel with a marine propulsion system.

A more detailed schematic of the marine vessel 10 is provided in FIG. 2. The marine vessel 10 includes a marine propulsion system 20 including a marine propulsion device. Here, two marine propulsion devices 12, 14 are shown, but only one propulsion device or more than two could be provided. A control module 16 (here, called a command control module "CCM") controls the magnitudes of thrusts T1, T2 of the propulsion devices 12, 14, such as by controlling speed of their internal combustion engines 22, 24. The control module 16 also controls shift positions of the propulsion devices 12, 14 between forward, neutral, and reverse by way of transmissions 26, 28. The steering angles of the propulsion devices 12, 14, which affect the angles of their thrusts T1, T2 with respect to an imaginary centerline of the marine vessel 10 running from bow to stern, are also controlled by the control module 16.

A command console 30 of the system 20 includes an electronic input device 32 having a display screen 34. For example, the electronic input device 32 can be a chart plotter, into which the operator of the vessel 10 can manually input anchor points, waypoints, or desired tracks; record actual routes as tracks; or download saved tracks, waypoints, or anchor points. Alternatively, the electronic input device 32 can be a series of gauges, buttons, levers, and/or a keypad that allows the operator of the vessel 10 to command the control module 16 to carry out various station keeping algorithms, as will be described herein below. A joystick 36 and a steering wheel 38 are also provided at the command console 30, and can provide steering commands to the propulsion devices 12, 14 via the control module 16, as is known. A pair of throttle/shift levers 40 is also provided, and the levers 40 are moveable between forward, neutral, and reverse positions, which signal the control module 16 to command corresponding shift positions of the transmissions 26, 28 and various speeds of the engines 22, 24, as is also known.

The system 20 also includes a position determination device 42, such as a GPS receiver, that provides to the control module 16 a current, actual geographic location of the vessel 10 in latitude and longitude. The position determination device 42 can also determine the speed of the vessel 10 over water by determining how far the vessel 10 travels, as determined from GPS position, over a given period of time. A heading detector 44, such as an inertial measurement unit (IMU), may also be provided in signal communication with the control module 16. The heading detector 44 detects a current, actual heading of the vessel 10. In other examples, the heading detector 44 is a compass or a gyroscope. In still other examples, the position determination device 42 and heading detector 44 are part of a single device, such as an attitude and heading reference system (AHRS) or a GPS-enabled IMU.

The control module 16 is programmable and includes a processing system and a storage system. The control module 16 can be located anywhere on the vessel 10 and/or located remote from the vessel 10 and can communicate with various components of the vessel 10 via a peripheral interface and wired and/or wireless links, as will be explained further herein below. Although FIG. 1 shows one control module 16, the vessel 10 can include more than one control module. Portions of the method disclosed herein below can be carried out by a single control module or by several separate control modules. For example, as shown in FIG. 2, the system 20 can have a control module 16 located at or near the command console 30 of the vessel 10 and can also have control module(s) such as propulsion control modules "PCMs" 46, 48 located in or near the propulsion devices 12, 14. If more than one control module is provided, each can control operation of a specific device or sub-system on the vessel 10. For example, the PCMs 46, 48 can interpret and carry out commands from the CCM 16 in order to produce the thrusts T1, T2, rotate the propulsion devices 12, 14 to different steering angles, change the speed of the engines 22, 24, and change shift positions via the transmissions 26, 28. In alternative embodiments, the CCM 16 directly controls these functions of the propulsion devices 12, 14.

In some examples, the control module 16 may include a computing system that includes a processing system, storage system, software, and input/output (I/O) interface for communicating with peripheral devices. The systems may be implemented in hardware and/or software that carries out a programmed set of instructions. For example, the processing system loads and executes software from the storage system, such as software programmed with one or more station keeping methods, which directs the processing system to operate as described herein below in further detail. The computing system may include one or more processors, which may be communicatively connected. The processing system can comprise a microprocessor, including a control unit and a processing unit, and other circuitry, such as semiconductor hardware logic, that retrieves and executes software from the storage system. The processing system can be implemented within a single processing device but can also be distributed across multiple processing devices or sub-systems that cooperate according to existing program instructions. The processing system can include one or many software modules comprising sets of computer executable instructions for carrying out various functions as described herein.

As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The storage system can comprise any storage media readable by the processing system and capable of storing software. The storage system can include volatile and non-volatile, removable and non-removable media implemented in any method or technology for storage of information, such as computer-readable instructions, data structures, software modules, or other data. The storage system can be implemented as a single storage device or across multiple storage devices or sub-systems. The storage system can include additional elements, such as a memory controller capable of communicating with the processing system. Non-limiting examples of storage media include random access memory, read-only memory, magnetic discs, optical discs, flash memory, virtual and non-virtual memory, various types of magnetic storage devices, or any other medium which can be used to store the desired information and that may be accessed by an instruction execution system. The storage media can be a transitory storage media or a non-transitory storage media such as a non-transitory tangible computer readable medium.

The provided description of the control module 16 is conceptual and should be interpreted generally, as those skilled in the art will recognize many ways to implement such a control module. These include implementation using a digital microprocessor that receives input signals and performs a calculation using the input signals to produce the corresponding output signals or actuator control signals. Also, analog computers may be used, which comprise circuit elements arranged to produce the desired outputs. Furthermore, look-up tables containing predetermined or calibrated data points may be stored in any fashion to provide the desired output corresponding to a given input signal.

The control module 16 communicates with one or more of the components on the vessel 10 via the I/O interface and a communication link, which can be a wired or wireless link. In one example, the communication link is a controller area network (CAN) bus, but other types of links could be used. The I/O interface allows the control module 16 to interact with both input devices, such as the position determination device 42, the heading detector 44, the electronic input device 32, the joystick 36, the steering wheel 38, and the throttle/shift levers 40, as well as with output devices such as the display screen 34 of the electronic input device 32 and the propulsion devices 12, 14. Other types of input devices can be provided in signal communication with the control module 16, such as keyboards, remote controls, voice command receivers, touch screens, keypads, buttons, etc., any of which may be part of the electronic input device 32. In the example in which the electronic input device 32 is a chart plotter, it may include a touch screen, display-only screen, and/or a keypad or buttons that allows the operator to select a station keeping anchor point by scrolling through a menu or selecting it from the touch screen. The actual position of the vessel 10 with respect to the anchor point may be displayed on a map on the display screen 34 of the chart plotter.

If features such as position jogging, heading jogging, fish-following, drifting, and advanced waypoint tracking are available, some of which will be described herein below, the control module 16 will repeatedly be controlling to a new position and/or heading while the given functionality is enabled. This will mean that any external disturbance forces, such as wind waves, current, etc., will rotate relative to the vessel's orientation. Through research and development, the present inventors have discovered that feed forward terms can be added to the PID output of the feedback controller 18 while in station keeping mode to counteract known or predicted environmental conditions. Typically, the feedback controller 18 compensates for all of these types of disturbances in all directions as position or heading error arises, as described herein above with respect to FIG. 1. As mentioned above, the feedback controller's integral term is considered to have a memory; however, in current systems, the integral term that is calculated for a given vessel position and/or orientation is lost once the station keeping function is disabled. This means the feedback controller 18 must recalculate the PID terms each time station keeping is re-enabled, which takes time. Therefore, the present inventors have developed ways to predict control parameters required at a new setpoint heading and/or position using information from an old setpoint heading and/or position (such as the external forces on the vessel or the PID control terms) in order to provide more efficient station keeping control.

Figure 3:
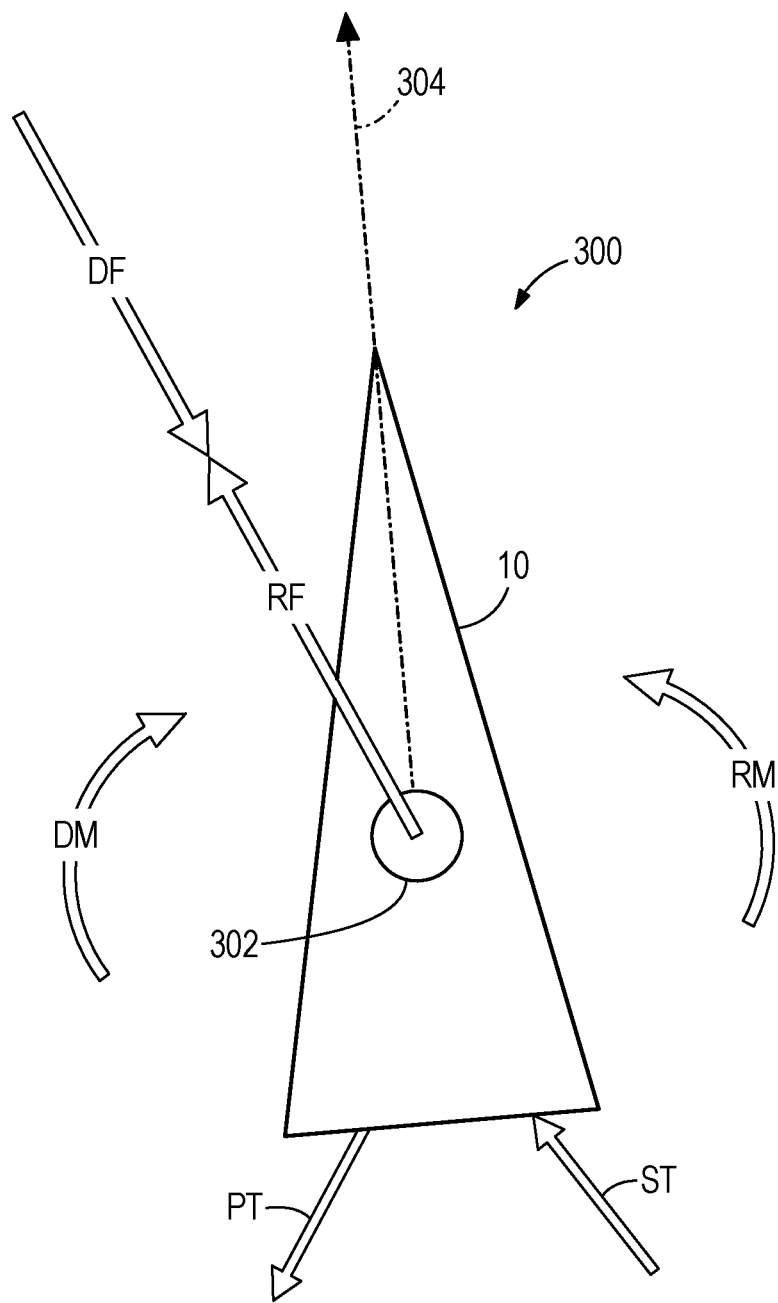
FIG. 3 shows a marine vessel at an initial selected global position and an initial selected heading.
Figure 4:
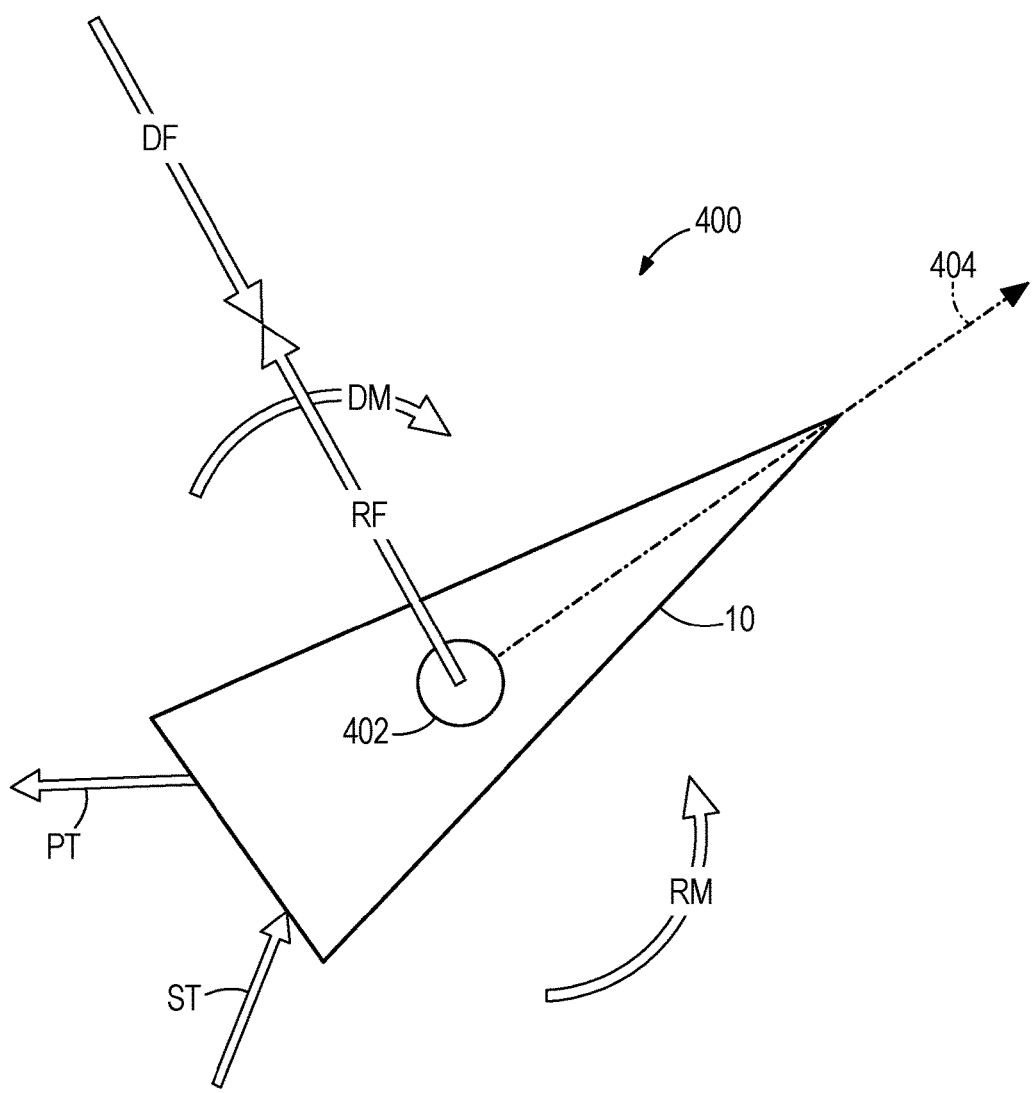
FIG. 4 shows a marine vessel at a new selected global position and a new selected heading.

By way of example, referring to FIG. 3, if the vessel 10 is in an initial state 300, the station keeping feedback control algorithm may require that the starboard propulsion device operate at 1200 RPM in forward gear with a steering angle of +20 degrees (see thrust ST), while the port propulsion device operates at 1400 RPM in reverse gear at a steering angle of −20 degrees (see thrust PT). As shown in FIG. 4, if the vessel 10 is then moved to a new state 400 and required to maintain a different heading (and potentially a new position), the station keeping feedback control algorithm may require that the starboard propulsion device operate at 3000 RPM in forward gear with a steering angle of +26 degrees (see thrust ST), while the port propulsion device operates at 3200 RPM in reverse gear at a steering angle of −26 degrees (see thrust PT). In both instances, the vessel 10 is maintaining its position against the same linear disturbance force DF by producing the same linear resultant force RF and is maintaining its heading against the same disturbance moment DM by producing the same resultant moment RM. However, the engine speeds, steering angles, and gear positions of the propulsion devices may need to change from the initial state 300 to the new state 400 in order to achieve such a resultant force RF and resultant moment RM. The predictive algorithm of the present disclosure can utilize information related to the position feedback control performed by the feedback controller 18 or information related to the resultant force RF or resultant moment RM at the initial state 300 to predict control parameters required for the propulsion devices 12, 14 to maintain the vessel 10 at the new state 400.

In one example, the predictive algorithm of the present disclosure can use the engine speeds, steering angles, and gear positions from the initial state 300 to back-calculate the external disturbance force against which the propulsion devices 12, 14 are acting. Because at the new state 400 the disturbance force DF and the disturbance moment DM are the same as at the initial state 300, new orientations and thrusts for the propulsion devices 12, 14 can be calculated to counteract the very same disturbance force DF and disturbance moment DM while the vessel 10 maintains the new state 400. In another example, the feedback control terms at the initial state 300 can be used to estimate and initialize the feedback control terms at the new state 400 using a thrust efficiency table based on the vessel's orientation to the external disturbances. The feedback control terms may also or instead be manipulated to prioritize certain types of vessel movements over others, such as to take into account that a vessel generally moves more easily forward than sideways and that driving is easier than crabbing. Thus, information from the initial state 300 can be used as a standalone adapted disturbance feed forward term or can be used to initialize the PID control terms in the new state 400. In either case, further PID control could be used at the new state 400.

Note that the present station keeping predictive algorithms could be used to maintain only vessel position at the first and second states, only vessel heading at the first and second states, or both vessel position and heading at the first and second states, as will be described now with respect to FIGS. 5-7.

Figure 5:
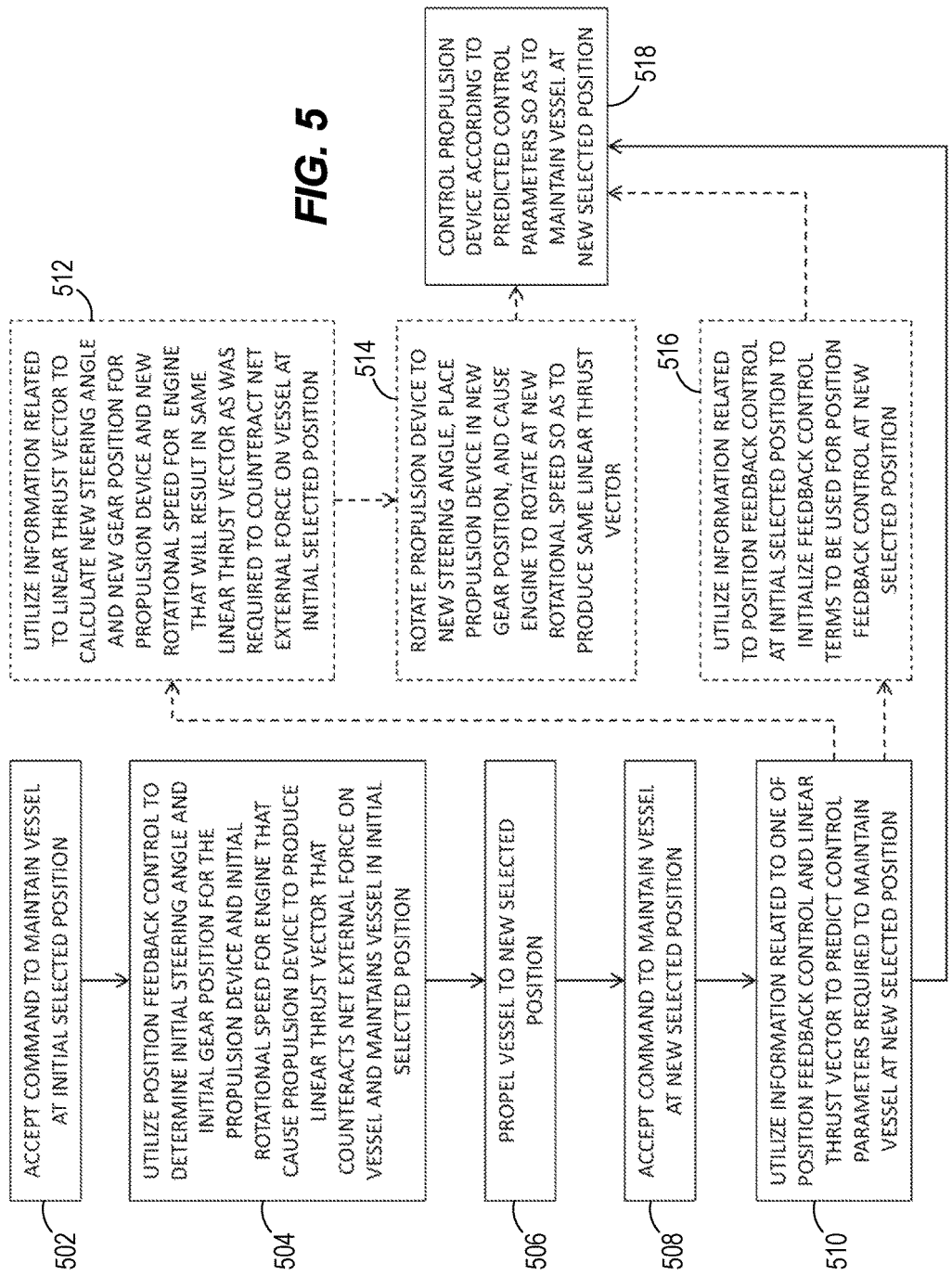
FIGS. 5-7 show various methods for maintaining position and/or heading of a marine vessel in a body of water.

FIG. 5 shows a method for maintaining position of a marine vessel 10 in a body of water. Note that the method of FIG. 5 will be referred to as being carried out by a single propulsion device 12 or 14 located at the centerline of the vessel 10, but two or more propulsion devices could be used. As shown at 502, the method includes accepting a command to maintain the vessel 10 at an initial selected position, for example, anchor point 302 shown in FIG. 3. As shown at 504, the method then includes utilizing position feedback control performed by the feedback controller 18 to determine an initial steering angle, an initial gear position, and an initial engine speed for the propulsion device 12 or 14 that cause the propulsion device 12 or 14 to produce a linear thrust vector RF that counteracts a net external force DF on the vessel 10 and maintains the vessel 10 in the initial selected position at 302. This is done according to the station keeping method described herein above with respect to FIG. 1.

As shown at 506, the method next includes propelling the vessel 10 to a new selected position, such as anchor point 402 in FIG. 4. As shown at 508, the method also includes accepting a command to maintain the vessel 10 at the new selected position 402. In one example, the method includes accepting the command to maintain the vessel 10 at the new selected position 402 from a user input device, such as electronic input device 32, joystick 36, steering wheel 38, etc. and subsequently propelling the marine vessel 10 to the new selected position 402. Therefore, the method need not be performed in the order shown at 506 and 508. For example, the command to maintain the vessel 10 at the new selected position 402 could include a command for the system 20 to remain in station keeping mode and continue counteracting external forces tending to yaw the vessel 10, but also to offset the initial anchor point by a certain number of feet forward, backward, left, or right. In another example, the vessel 10 may be propelled to the new selected position 402 before it is commanded to maintain the new selected position 402, such as if the station keeping mode is disabled at the initial state 300 and then re-enabled once the vessel 10 is at the new state 400. In either example, the operator could choose the new anchor point 402 by manually driving the vessel 10 there, or by selecting an anchor point from an electronic navigation device, and allowing the control module 16 to take control of the propulsion system 20 to automatically propel the vessel 10 to the new anchor point 402.

As shown at 510, the method next includes utilizing information related to one of (a) the position feedback control and (b) the linear thrust vector to predict control parameters required to maintain the vessel 10 at the new selected position 402. The method then includes controlling the propulsion device 12 or 14 according to the predicted control parameters to maintain the vessel 10 at the new selected position 402, as shown at 518. The options for arriving at 518 will now be described with respect to optional steps 512 and 514 and optional step 516.

With respect to option (a), as shown at 516, the method may include utilizing the information related to the position feedback control at the initial selected position 302 to initialize feedback control terms to be used for the position feedback control at the new selected position 402. This may include using a thrust efficiency table stored in a memory of the control module 16 to estimate the feedback control terms that will be used for the position feedback control at the new selected position 402. For example, such a table would provide at least some compensation for the change in thrust efficiency of a propeller as it rotates in forward or reverse when powered at the same engine speed. The control module 16 may save the final PID control terms from position feedback control at the initial selected position 302, and may then use these same terms, or terms that have been modified according to the thrust efficiency tables, to initialize the feedback control at the new selected position 402. Initializing the PID values the feedback controller 18 will use in the new selected position 402 allows for tighter and more responsive control over the vessel's station keeping, because the feedback controller 18 does not need to wind up or down after the vessel 10 changes position.

With respect to option (b), as shown at 512, the method may include utilizing the information related to the linear thrust vector RF to calculate a new steering angle, a new gear position, and a new engine speed for the propulsion device 12 or 14 that will result in the same linear thrust vector RF as was required to counteract the net external force DF on the vessel 10 at the initial selected position 302. Subsequently, the method may include rotating the propulsion device 12 or 14 to the new steering angle, placing the propulsion device 12 or 14 in the new gear position, and causing the engine 22 or 24 to rotate at the new engine speed to produce the same linear thrust vector RF, as shown at 514. The control module 16 automatically causes the propulsion device 12 or 14 to produce the same linear thrust vector RF upon propelling the vessel 10 to the new selected position 402 and accepting the command to maintain the vessel 10 at the new selected position 402, without first waiting for position feedback information at the new selected position 402, thereby immediately counteracting the net external force DF.

More specifically, the method may include determining the net external force DF on the vessel 10 at the initial selected position 302, and then back-calculating the magnitude and direction of thrust needed from the propulsion device 12 or 14 once the vessel 10 is in the new selected position 402. The net external force DF on the vessel 10 at the initial selected position 302 can be determined using vector addition, knowing that if the vessel 10 is remaining stationary despite external forces acting on the vessel 10, the magnitude(s) and direction(s) of thrust produced by the propulsion device(s) must be counteracting the net external force DF. If one propulsion device is provided, that propulsion device will produce a magnitude of thrust that is the same as the magnitude of the net external force DF, but opposite in direction to the net eternal force DF. If two or more propulsion devices are provided, the two propulsion devices' thrusts together will add to produce a resultant thrust having a magnitude that is the same as the magnitude of the net external force DF, but opposite in direction to the net external force DF. Known vector calculations and geometry can therefore be used to determine the net external force DF on the vessel 10, given the propulsion device(s)' thrusts T1, T2.

The net external force DF caused by wind, waves, current, etc. and the counteracting resultant force RF produced by the propulsion system 20 are vectors defined in the cardinal direction system (N-S-E-W). In contrast, the control module 16 determines the thrusts of the propulsion devices 12, 14 in a coordinate system having the vessel 10 as its origin, in the fore, aft, port, and starboard directions, with yaw being measured from the vessel's current heading. For purposes of calculating the new steering angle, new gear position, and new rotational speed for the engine 22 or 24 that will result in production of the same linear thrust vector RF as was required to counteract the net external force DF on the vessel 10 at the initial selected position 302, the control module 16 resolves the linear thrust vector RF (defined in the cardinal direction system) into vector components to be produced by the propulsion devices' thrusts (defined in the vessel-based coordinate system). The control module 16 may use a coordinate transform algorithm to do so.

The method may also include determining an actual position of the vessel 10 after propelling the vessel 10 to the new selected position 402, rotating the propulsion device 12 or 14 to the new steering angle, placing the propulsion device 12 or 14 in the new gear position, and causing the engine 22 or 24 to rotate at the new rotational speed. The control module 16 will then use the position feedback control provided by feedback controller 18 to adjust at least one of the new steering angle, the new gear position, and the new rotational speed to minimize a difference between the actual position of the vessel 10 and the new selected position 402. This may be needed in the case when the vessel 10 has changed position from the initial state 300 to the new state 400, because wind, waves, and current at each anchor point 302 and 402 may not be the same.

Figure 6:
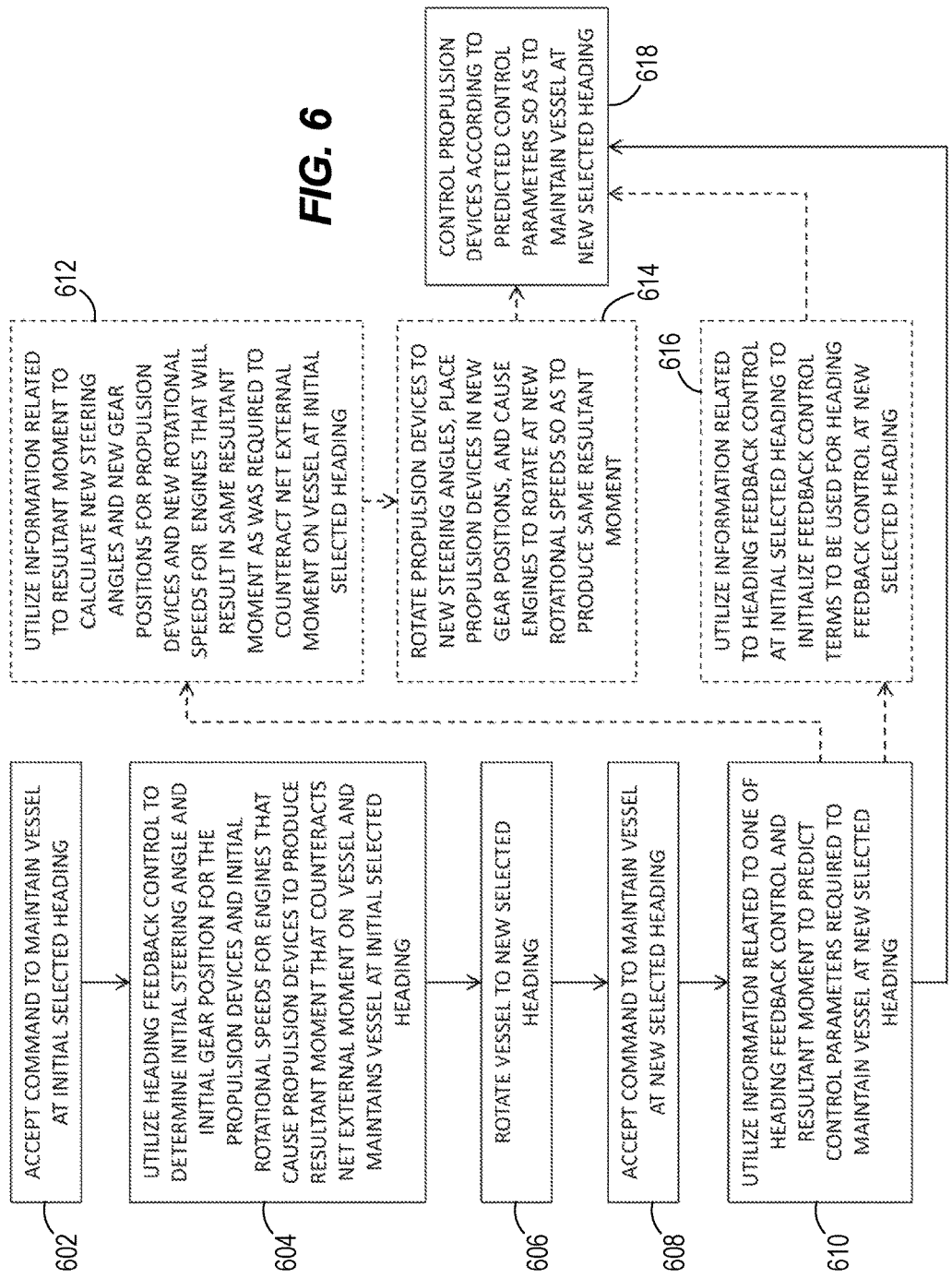

Turning to FIG. 6, a method for maintaining orientation of a marine vessel 10 in a body of water will now be described. In this example, the vessel 10 is propelled by first and second marine propulsion devices 12, 14 powered by first and second engines 22, 24, respectively, as shown in FIG. 2. (The provision to two propulsion devices 12, 14 makes it easier to rotate the vessel 10 about a given point, such as its center of gravity, without affecting its global position.) As shown at 602, the method includes accepting a command to maintain the vessel 10 at an initial selected heading, such as heading 304 shown in FIG. 3. As shown at 604, the method then includes utilizing heading feedback control to determine initial steering angles, initial gear positions, and initial engine speeds for the first and second propulsion devices 12, 14, respectively, which result in the first and second propulsion devices 12, 14 together producing a resultant moment RM about a preselected point (e.g., the center of gravity) on the vessel 10 that counteracts a net external moment DM on the vessel 10 and maintains the vessel 10 at the initial selected heading 304.

As shown at 606, the method then includes rotating the vessel 10 to a new selected heading, such as heading 404 in FIG. 4. The method also includes accepting a command to maintain the vessel 10 at the new selected heading 404. As described with respect to the position change of FIG. 5, the actions at 606 and 608 could be reversed. For example, the method may include accepting the command to maintain the vessel 10 at the new selected heading 404 from a user input device, such as the electronic input device 32, the joystick 36, or the steering wheel 38, and subsequently rotating the marine vessel 10 to the new selected heading 404. This could be done if the operator wishes to remain in station keeping mode and to continue counteracting external forces tending to push the vessel off the anchor point 402, but also wishes to rotate the vessel 10 a given number of degrees clockwise or counterclockwise.

As shown at 610, the method next includes utilizing information related to one of (a) the heading feedback control and (b) the resultant moment RM to predict control parameters required to maintain the vessel 10 at the new selected heading 404. The method next includes controlling the first and second propulsion devices 12, 14 according to the predicted control parameters to maintain the vessel 10 at the new selected heading 404, as shown at 618.

According to option (a), as shown at 616, the method may include utilizing the information from the feedback controller 18 related to the heading feedback control at the initial selected heading 304 to initialize feedback control terms to be used for the heading feedback control at the new selected heading 404. As described above with respect to position control, this may include using a thrust efficiency table to estimate the feedback control terms that will be used for the heading feedback control at the new selected heading 404. The control module 16 may save the final PID terms from heading feedback control at the initial selected heading 304, and may then use these same terms, or terms that have been modified according to the thrust efficiency tables, to initialize the heading feedback control at the new selected heading 404.

Additionally, this PID term initialization feature could be expanded to standard waypoint tracking and auto-heading modes to compensate for crabbing disturbances as the vessel's heading changes. The strategy would be applied to the steering wheel command in these cases, and would apply to heading control but not to position control.

Regarding option (b), as shown at 612, the method includes utilizing the information related to the resultant moment RM to calculate new steering angles, new gear positions, and new engine speeds for the first and second propulsion devices 12, 14, respectively, that will result in the first and second propulsion devices 12, 14 together creating the same resultant moment RM as was required to counteract the net external moment DM on the vessel 10 at the initial selected heading 304. As shown at 614, the method then includes rotating the first and second propulsion devices 12, 14 to the new steering angles, respectively, placing the first and second propulsion devices 12, 14 in the new gear positions, respectively, and causing the first and second engines 22, 24 to rotate at the new rotational speeds, respectively, to produce the same resultant moment RM. Note that in order to achieve particular required net thrusts or net moments, the propulsion devices 12, 14 need not have the same steering angles, gear positions, and/or engine speeds.

For example, the method may include determining the net external moment DM on the vessel 10 at the initial selected heading 304, and then back-calculating the magnitude and direction of thrust needed from each of the propulsion devices 12 or 14 once the vessel 10 is at the new selected heading 404. The two propulsion devices' thrusts T1, T2 together will produce a resultant moment RM having a magnitude that is the same as the magnitude of the net external moment DM, but opposite in direction to the net external moment DM. Known geometry and transform algorithms can be used to achieve such back-calculation, similar to the method used when the anchor point has changed. For example, for purposes of calculating the new steering angles, new gear positions, and new rotational speeds for the propulsion devices 12, 14 that will result in the same resultant moment RM as was required to counteract the net external moment DM on the vessel 10 at the initial selected heading 304, the control module 16 must resolve the single resultant moment RM in the cardinal direction system into two or more component thrusts (depending on the number of propulsion devices) that together counteract the net external moment DM and are defined in the vessel-based coordinate system. The control module 16 uses a coordinate transform algorithm to do so.

The method may also include automatically causing the first and second propulsion devices 12, 14 to produce the same resultant moment RM upon rotating the vessel 10 to the new selected heading 404 and accepting the command to maintain the vessel 10 at the new selected heading 404, without first waiting for heading feedback information at the new selected heading. This method is particularly effective when the vessel 10 remains at substantially the same global position (anchor point) but changes its heading, as external conditions are unlikely to have changed in such a situation. The method may also include determining an actual heading of the vessel 10 after rotating the vessel 10 to the new selected heading 404, rotating the first and second propulsion devices 12, 14 to the new steering angles, placing the first and second propulsion devices 12, 14 in the new gear positions, and causing the first and second engines 22, 24 to rotate at the new rotational speeds, and using the heading feedback control to adjust at least one of the new steering angles, the new gear positions, and the new rotational speeds to minimize a difference between the actual heading and the new selected heading 404. This may be useful if external conditions have in fact changed since the vessel 10 was rotated.

As mentioned above, the heading and position of the vessel 10 can both be changed from the initial state 300 to the new state 400. For example, the method of FIG. 6 could further include accepting a command to maintain the vessel 10 at an initial selected position 302 while maintaining the initial selected heading 304, and utilizing position feedback control and heading feedback control to determine the initial steering angles, the initial gear positions, and the initial engine speeds for the first and second propulsion devices 12, 14, respectively, which result in the first and second propulsion devices 12, 14 together producing a resultant linear thrust vector RF that counteracts a net external force DF on the vessel 10 and maintains the vessel 10 in an initial selected position 302, and which result in the first and second propulsion devices 12, 14 together producing the resultant moment RM about the preselected point (e.g., center of gravity) on the vessel 10 that counteracts the net external moment DM on the vessel 10 and maintains the vessel 10 at the initial selected heading 304. The method may also include propelling the vessel 10 to a new selected position 402 while rotating the vessel 10 to the new selected heading 404 and accepting a command to maintain the vessel 10 at the new selected position 402 while maintaining the vessel 10 at the new selected heading 404. The control module 16 can use information related to one of (a) the heading feedback control and the position feedback control, or (b) the resultant moment RM and the resultant linear thrust vector RF to predict control parameters required to maintain the vessel 10 at the new selected heading 404 and the new selected position 402. The control module 16 will then control the first and second propulsion devices 12, 14 according to the predicted control parameters to maintain the vessel 10 at the new selected heading 404 and the new selected position 402.

Figure 7:
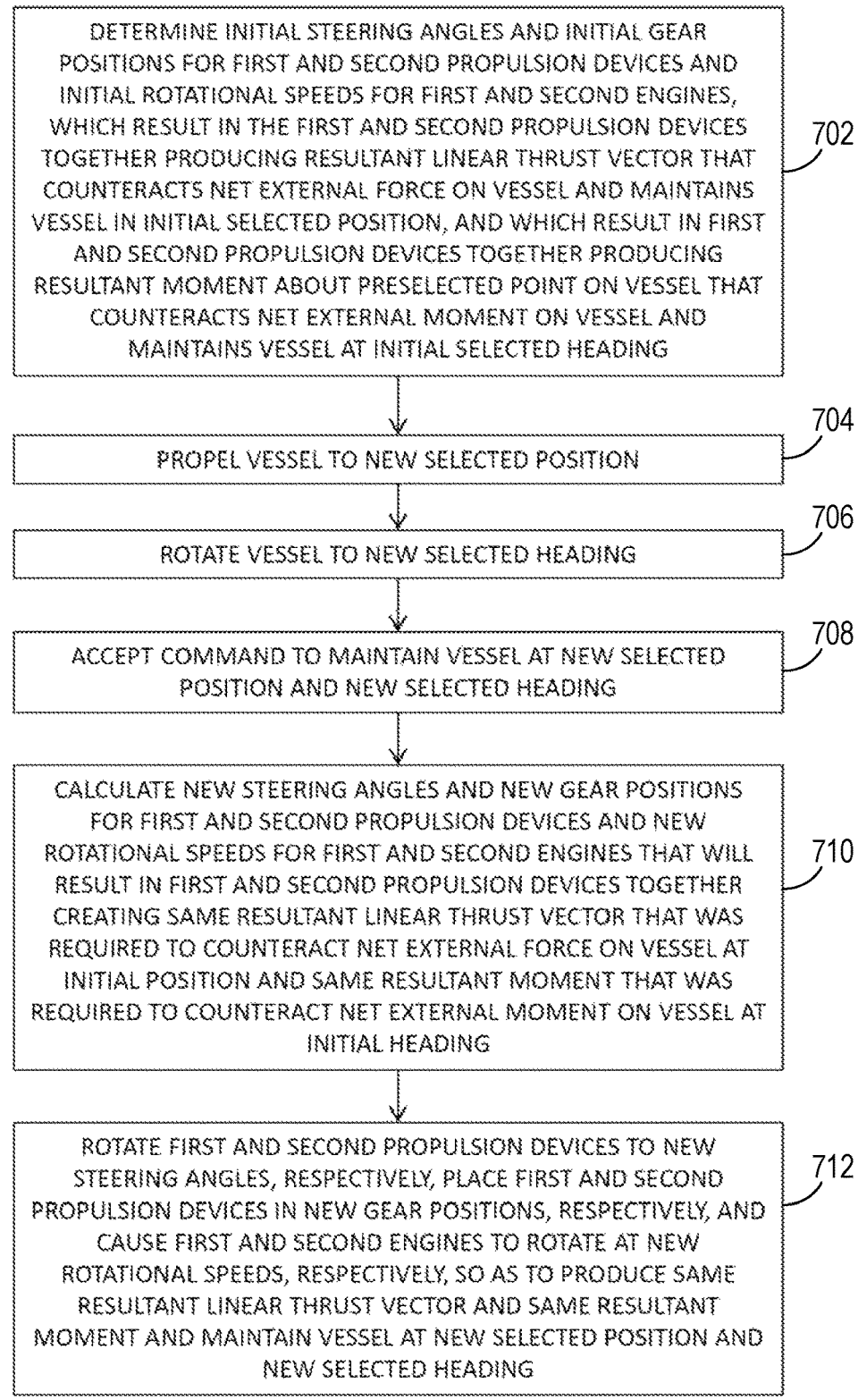

Another method for maintaining position and orientation of a marine vessel 10 in a body of water is shown in FIG. 7. As shown at 702, the method comprises determining initial steering angles, initial gear positions, and initial engine speeds for the first and second propulsion devices 12, 14, respectively, which result in the first and second propulsion devices 12, 14 together producing a resultant linear thrust vector RF that counteracts a net external force DF on the vessel 10 and maintains the vessel 10 in an initial selected position 302, and which result in the first and second propulsion devices 12, 14 together producing a resultant moment RM about a preselected point on the vessel 10 that counteracts a net external moment DM on the vessel 10 and maintains the vessel 10 at an initial selected heading 304. As shown at 704, the method also includes propelling the vessel 10 to a new selected position 402; as shown at 706, rotating the vessel 10 to a new selected heading 404; and as shown at 708, accepting a command to maintain the vessel 10 at the new selected position 402 and at the new selected heading 404. Next, as shown at 710, the method includes calculating new steering angles, new gear positions, and new engine speeds for the first and second propulsion devices 12, 14, respectively, that will result in the first and second propulsion devices 12, 14 together creating the same resultant linear thrust vector RF that was required to counteract the net external force DF on the vessel 10 at the initial selected position 302 and the same resultant moment RM that was required to counteract the net external moment DM on the vessel 10 at the initial selected heading 304. As shown at 712, the method also includes rotating the first and second propulsion devices 12, 14 to the new steering angles, respectively, placing the first and second propulsion devices 12, 14 in the new gear positions, respectively, and causing the first and second engines 22, 24 to rotate at the new rotational speeds, respectively, to produce the same resultant linear thrust vector RF and the same resultant moment RM and maintain the vessel 10 at the new selected position 402 and the new selected heading 404.

The method may also include accepting the command to maintain the vessel 10 at the new selected position 402 and the new selected heading 404 from a user input device, and subsequently propelling the vessel 10 to the new selected position 402 and rotating the vessel to the new selected heading 404. Alternatively, the method may include propelling the vessel 10 to the new selected position 402 and rotating the vessel to the new selected heading 404, and subsequently accepting the command to maintain the vessel 10 at the new selected position 402 and at the new selected heading 404.

Information about current, wind, waves, or other conditions could also be pre-emptively accounted for at the initial state 300 and/or the new state 400. For example, information about current, wind, waves, etc. could be retrieved from the internet (e.g., if it is saved in the cloud by other boaters) and used in the very first instance to initialize the PID terms at the initial state 300 and/or the new state. Further PID control could be used to correct for any difference between the information retrieved from the internet and the actual conditions encountered by the vessel 10.

Many different types of user inputs could be utilized in order to change the vessel's position or heading from, for example, the initial state 300 to the new state 400. Additionally, as described briefly herein above, these user inputs could result in action (including but not limited to change in heading, change in position, or change in both heading and position) all while the propulsion system 20 remains in the station keeping mode. In current systems, if an operator wishes to change heading or position, (s)he first needs to disengage station keeping, immediately manipulate user input devices to offset any environmental forces that the propulsion devices 12, 14 had been offsetting automatically, and then supply additive input to change the vessel's heading and/or position. To remain at this new heading and/or position, the operator then needed to re-engage station keeping mode. In contrast, some examples of the present disclosure allow the operator to change vessel position and/or heading while any environmental influences are still being offset automatically by the station keeping algorithm. Thus, the operator can easily reposition the vessel 10 without any knowledge of the environmental influences being applied to the vessel 10 and how to overcome them under complete manual control.

To change the position and/or heading of the vessel while remaining in station keeping mode, the operator can use an electronic input device 32 such as a chart plotter, keypad or trackpad, a joystick 36, a steering wheel 38, or the like. Each of these devices can be programmed to allow the operator to change a different axis of the vessel's orientation while maintaining all other axes (e.g., to change position while maintaining heading). When the operator ceases input to the given user input device, the station keeping algorithm will maintain the newly commanded orientation. Some examples of user input devices that can be used to change different axes of orientation are provided herein, it being understood that various alternatives are within the scope of the present disclosure.

One option for changing heading is to accept input to a keypad, which has right and left "turn" buttons, as being a command to rotate right or left. Another option is to accept input from a joystick 36 to "jog" the vessel's position and/or heading. For example, a lateral jog to the left would move the boat X meters to the left, one rotational jog counter-clockwise would move the heading Y degrees in the counter-clockwise direction, etc. Using the joystick 36 would also allow the operator to jog in the diagonal directions or to do compound movements (e.g., to jog in the fore/right quadrant and yaw Y degrees at the same time), because the joystick 36 has three separate axes (fore/aft, left/right, and yaw). An interactive display device with a touchscreen (e.g. electronic input device 32 and display screen 34) could also be used to jog right/left or fore/aft and to yaw. Using the display device would also allow compound directions (similar to the joystick input-based jog) and user-calibrated jog amounts (e.g., the user could specify five meters versus three meters per jog). The steering wheel 38 could also be used to jog/adjust the heading while in station keeping mode, where the degree of turn of the steering wheel 38 translates to a request for a proportional yaw movement.

Note that the above input devices could also be used in the methods in which the operator does disengage station keeping, but in alternative ways. However, methods of engaging and disengaging station keeping are described in the patents incorporated herein by reference, and methods for moving vessels according to commands from a joystick 36 or throttle/shift levers 40 and steering wheel 38 are well known, and therefore these methods will not be described further herein.

In the above description, certain terms have been used for brevity, clarity, and understanding. No unnecessary limitations are to be inferred therefrom beyond the requirement of the prior art because such terms are used for descriptive purposes and are intended to be broadly construed. The different systems described herein may be used alone or in combination with other systems. It is to be expected that various equivalents, alternatives and modifications are possible within the scope of the appended claims. Each limitation in the appended claims is intended to invoke interpretation under 35 U.S.C. § 112(f), only if the terms "means for" or "step for" are explicitly recited in the respective limitation.

What is claimed is:

1. A method for maintaining position of a marine vessel in a body of water, the vessel being propelled by a marine propulsion device powered by an engine, the method comprising:
   accepting a command to maintain the vessel at an initial selected position;
   utilizing position feedback control to determine an initial steering angle, an initial gear position, and an initial engine speed for the propulsion device that cause the propulsion device to produce a linear thrust vector that counteracts a net external force on the vessel and maintains the vessel in the initial selected position;
   propelling the vessel to a new selected position;
   accepting a command to maintain the vessel at the new selected position;
   utilizing information related to one of the position feedback control and the linear thrust vector to predict control parameters required to maintain the vessel at the new selected position; and
   controlling the propulsion device according to the predicted control parameters to maintain the vessel at the new selected position.

2. The method of claim 1, further comprising:
   utilizing the information related to the linear thrust vector to calculate a new steering angle, a new gear position, and a new engine speed for the propulsion device that will result in the same linear thrust vector as was required to counteract the net external force on the vessel at the initial selected position; and
   rotating the propulsion device to the new steering angle, placing the propulsion device in the new gear position, and causing the engine to rotate at the new engine speed to produce the same linear thrust vector.

3. The method of claim 2, further comprising automatically causing the propulsion device to produce the same linear thrust vector upon propelling the vessel to the new selected position and accepting the command to maintain the vessel at the new selected position, without first waiting for position feedback information at the new selected position.

4. The method of claim 3, further comprising:
   determining an actual position of the vessel after propelling the vessel to the new selected position, rotating the propulsion device to the new steering angle, placing the propulsion device in the new gear position, and causing the engine to rotate at the new engine speed; and
   using the position feedback control to adjust at least one of the new steering angle, the new gear position, and the new engine speed to minimize a difference between the actual position and the new selected position.

5. The method of claim 1, further comprising utilizing the information related to the position feedback control at the initial selected position to initialize feedback control terms to be used for the position feedback control at the new selected position.

6. The method of claim 5, further comprising using a thrust efficiency table to estimate the feedback control terms that will be used for the position feedback control at the new selected position.

7. The method of claim 1, further comprising accepting the command to maintain the vessel at the new selected position from a user input device, and subsequently propelling the marine vessel to the new selected position.

8. The method of claim 7, wherein the user input device is an electronic navigation device.

9. A method for maintaining orientation of a marine vessel in a body of water, the vessel being propelled by first and second marine propulsion devices powered by first and second engines, respectively, the method comprising:
   accepting a command to maintain the vessel at an initial selected heading;
   utilizing heading feedback control to determine initial steering angles, initial gear positions, and initial engine speeds for the first and second propulsion devices, respectively, which result in the first and second propulsion devices together producing a resultant moment about a preselected point on the vessel that counteracts a net external moment on the vessel and maintains the vessel at the initial selected heading;
   rotating the vessel to a new selected heading;
   accepting a command to maintain the vessel at the new selected heading;
   utilizing information related to one of the heading feedback control and the resultant moment to predict control parameters required to maintain the vessel at the new selected heading; and
   controlling the first and second propulsion devices according to the predicted control parameters to maintain the vessel at the new selected heading.

10. The method of claim 9, further comprising:
    utilizing the information related to the resultant moment to calculate new steering angles, new gear positions, and new engine speeds for the first and second propulsion devices, respectively, that will result in the first and second propulsion devices together creating the same resultant moment as was required to counteract the net external moment on the vessel at the initial selected heading; and
    rotating the first and second propulsion devices to the new steering angles, respectively, placing the first and second propulsion devices in the new gear positions, respectively, and causing the first and second engines to rotate at the new engine speeds, respectively, to produce the same resultant moment.

11. The method of claim 10, further comprising automatically causing the first and second propulsion devices to produce the same resultant moment upon rotating the vessel to the new selected heading and accepting the command to maintain the vessel at the new selected heading, without first waiting for heading feedback information at the new selected heading.

12. The method of claim 11, further comprising:
determining an actual heading of the vessel after rotating the vessel to the new selected heading, rotating the first and second propulsion devices to the new steering angles, placing the first and second propulsion devices in the new gear positions, and causing the first and second engines to rotate at the new engine speeds; and
using the heading feedback control to adjust at least one of the new steering angles, the new gear positions, and the new engine speeds to minimize a difference between the actual heading and the new selected heading.

13. The method of claim 9, further comprising utilizing the information related to the heading feedback control at the initial selected heading to initialize feedback control terms to be used for the heading feedback control at the new selected heading.

14. The method of claim 13, further comprising using a thrust efficiency table to estimate the feedback control terms that will be used for the heading feedback control at the new selected heading.

15. The method of claim 9, further comprising accepting the command to maintain the vessel at the new selected heading from a user input device, and subsequently rotating the marine vessel to the new selected heading.

16. The method of claim 15, wherein the user input device is a joystick.

17. The method of claim 9, further comprising:
accepting a command to maintain the vessel at an initial selected position while maintaining the initial selected heading;
utilizing position feedback control and the heading feedback control to determine the initial steering angles, the initial gear positions, and the initial engine speeds for the first and second propulsion devices, respectively, which result in the first and second propulsion devices together producing a resultant linear thrust vector that counteracts a net external force on the vessel and maintains the vessel in the initial selected position, and which result in the first and second propulsion devices together producing the resultant moment about the preselected point on the vessel that counteracts the net external moment on the vessel and maintains the vessel at the initial selected heading;
propelling the vessel to a new selected position while rotating the vessel to the new selected heading;
accepting a command to maintain the vessel at the new selected position while maintaining the vessel at the new selected heading;
utilizing information related to one of (a) the heading feedback control and the position feedback control, or (b) the resultant moment and the resultant linear thrust vector to predict control parameters required to maintain the vessel at the new selected heading and the new selected position; and
controlling the first and second propulsion devices according to the predicted control parameters to maintain the vessel at the new selected heading and the new selected position.

18. A method for maintaining position and orientation of a marine vessel in a body of water, the marine vessel being propelled by first and second marine propulsion devices powered by first and second engines, respectively, the method comprising:
determining initial steering angles, initial gear positions, and initial engine speeds for the first and second propulsion devices, respectively, which result in the first and second propulsion devices together producing a resultant linear thrust vector that counteracts a net external force on the vessel and maintains the vessel in an initial selected position, and which result in the first and second propulsion devices together producing a resultant moment about a preselected point on the vessel that counteracts a net external moment on the vessel and maintains the vessel at an initial selected heading;
propelling the vessel to a new selected position;
rotating the vessel to a new selected heading;
accepting a command to maintain the vessel at the new selected position and at the new selected heading;
calculating new steering angles, new gear positions, and new engine speeds for the first and second propulsion devices, respectively, that will result in the first and second propulsion devices together creating the same resultant linear thrust vector that was required to counteract the net external force on the vessel at the initial selected position and the same resultant moment that was required to counteract the net external moment on the vessel at the initial selected heading; and
rotating the first and second propulsion devices to the new steering angles, respectively, placing the first and second propulsion devices in the new gear positions, respectively, and causing the first and second engines to rotate at the new engine speeds, respectively, to produce the same resultant linear thrust vector and the same resultant moment and maintain the vessel at the new selected position and the new selected heading.

19. The method of claim 18, further comprising accepting the command to maintain the vessel at the new selected position and the new selected heading from a user input device, and subsequently propelling the vessel to the new selected position and rotating the vessel to the new selected heading.

20. The method of claim 18, further comprising propelling the vessel to the new selected position and rotating the vessel to the new selected heading, and subsequently accepting the command to maintain the vessel at the new selected position and at the new selected heading.

* * * * *

UNITED STATES PATENT AND TRADEMARK OFFICE
CERTIFICATE OF CORRECTION

PATENT NO. : 10,095,232 B1
APPLICATION NO. : 15/445031
DATED : October 9, 2018
INVENTOR(S) : Jason S. Arbuckle et al.

Page 1 of 1

It is certified that error appears in the above-identified patent and that said Letters Patent is hereby corrected as shown below:

In the Claims

In Claim 7, at Column 16, Line 23: "propelling the marine vessel" should instead read --propelling the vessel--.

In Claim 15, at Column 17, Line 30: "rotating the marine vessel" should instead read --rotating the vessel--.

In Claim 17, at Column 18, Line 1: "vector to predict control parameters" should instead read --vector to predict the control parameters--.

In Claim 18, at Column 18, Line 9: "the marine vessel being propelled" should instead read --the vessel being propelled--.

Signed and Sealed this
Eighteenth Day of December, 2018

Andrei Iancu
*Director of the United States Patent and Trademark Office*